(12) United States Patent
Schmidt et al.

(10) Patent No.: US 8,690,991 B2
(45) Date of Patent: Apr. 8, 2014

(54) SUPPORTED SILVER SULFIDE SORBENT

(75) Inventors: Roland Schmidt, Bartlesville, OK (US); Mark A. Hughes, Owasso, OK (US); John Michael Hays, Bartlesville, OK (US); Robert William Morton, Bartlesville, OK (US); Jon M. Nelson, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 84 days.

(21) Appl. No.: 13/241,735

(22) Filed: Sep. 23, 2011

(65) Prior Publication Data

US 2012/0073439 A1   Mar. 29, 2012

Related U.S. Application Data

(60) Provisional application No. 61/386,354, filed on Sep. 24, 2010.

(51) Int. Cl.
| | |
|---|---|
| *B01D 53/02* | (2006.01) |
| *B01J 20/02* | (2006.01) |
| *B01J 20/06* | (2006.01) |
| *B01J 20/32* | (2006.01) |
| *B01J 20/34* | (2006.01) |
| *B01D 53/64* | (2006.01) |
| *B01D 53/86* | (2006.01) |

(52) U.S. Cl.
CPC .............. *B01J 20/0233* (2013.01); *B01J 20/02* (2013.01); *B01J 20/0285* (2013.01); *B01J 20/06* (2013.01); *B01J 20/3236* (2013.01); *B01J 20/34* (2013.01); *B01D 53/02* (2013.01); *B01D 53/64* (2013.01); *B01D 53/8665* (2013.01); *B01D 2253/102* (2013.01); *B01D 2253/104* (2013.01); *B01D 2253/108* (2013.01); *B01D 2253/1128* (2013.01); *B01D 2253/25* (2013.01); *B01D 2256/24* (2013.01); *B01D 2257/602* (2013.01); *B01D 2258/0283* (2013.01); *B01D 2259/4009* (2013.01)
USPC ................... 95/134; 95/133; 502/60; 502/80; 502/400; 502/407; 502/417; 427/343

(58) Field of Classification Search
CPC .... B01J 20/02; B01J 20/0233; B01J 20/0285; B01J 20/06; B01J 20/3236; B01J 20/34; B01D 53/8665; B01D 53/02; B01D 53/64; B01D 2253/102; B01D 2253/104; B01D 2253/108; B01D 2253/1128; B01D 2253/25; B01D 2256/24; B01D 2257/602; B01D 2258/0283; B01D 2259/4009
USPC ........ 95/133, 134; 502/60, 80, 400, 407, 417, 502/748; 427/343
See application file for complete search history.

(56) References Cited

U.S. PATENT DOCUMENTS

| | | | |
|---|---|---|---|
| 4,090,777 | A | 5/1978 | Sugier et al. |
| 4,874,525 | A | 10/1989 | Markovs |

(Continued)

FOREIGN PATENT DOCUMENTS

| | | |
|---|---|---|
| DE | 1004173 | 9/1965 |
| WO | 2009010692 | 1/2009 |

OTHER PUBLICATIONS

J.P. Franey, G.W. Kammlott and T.E. Graedel, "The Corrosion of Silver by Atmospheric Sulfurous Gases", AT&T Bell Laboratories, Corrosion Science, vol. 25, No. 2, 1985, pp. 133-143.

(Continued)

*Primary Examiner* — Christopher P Jones

(74) *Attorney, Agent, or Firm* — Phillips 66 Company

(57) ABSTRACT

Synthesis of a support material impregnated with silver sulfide provides a sorbent composition. Generating the silver sulfide relies on reaction of sulfur dioxide and one of hydrogen gas and hydrogen sulfide in presence of the support material following silver loading of the support material. Contacting a fluid stream with the sorbent composition removes heavy metal from the fluid stream.

9 Claims, 2 Drawing Sheets

(56) References Cited

U.S. PATENT DOCUMENTS

| | | |
|---|---|---|
| 4,892,567 A | 1/1990 | Yan |
| 4,909,926 A | 3/1990 | Yan |
| 4,911,825 A * | 3/1990 | Roussel et al. ............ 208/251 R |
| 4,933,159 A | 6/1990 | Nowack et al. |
| 5,053,209 A | 10/1991 | Yan |
| 5,080,799 A | 1/1992 | Yan |
| 5,271,760 A | 12/1993 | Markovs et al. |
| 5,281,258 A | 1/1994 | Markovs |
| 5,419,884 A | 5/1995 | Weekman et al. |
| 6,719,828 B1 | 4/2004 | Lovell et al. |
| 7,081,434 B2 | 7/2006 | Sinha |
| 2004/0180788 A1 | 9/2004 | Khalili et al. |
| 2009/0145343 A1 | 6/2009 | Mauldin et al. |
| 2012/0073811 A1 * | 3/2012 | Mock ............................ 166/279 |

OTHER PUBLICATIONS

Ch. Kleber, R. Wiesinger, J. Schnoller, U. Hilfrich, H. Hutter and M. Schreiner, "Initial Oxidation of Silver Surfaces by S2− and S4+ Species", ScienceDirect, Corrosion Science 50, 2008, pp. 1112-1121.

"European Patent Search Report," Application No. 11182637.6-1270, 5 pages.

\* cited by examiner

SUPPORTED SILVER SULFIDE SORBENT

CROSS-REFERENCE TO RELATED APPLICATIONS

This application is a non-provisional application which claims benefit under 35 USC §119(e) to U.S. Provisional Application Ser. No. 61/386,354 filed Sep. 24, 2010, entitled "SUPPORTED SILVER SULFIDE SORBENT," which is incorporated herein in its entirety.

STATEMENT REGARDING FEDERALLY SPONSORED RESEARCH OR DEVELOPMENT

None.

FIELD OF THE INVENTION

Embodiments of the invention relate to compositions for treatment of fluids to remove heavy metals and preparation and use of the compositions.

BACKGROUND OF THE INVENTION

Presence of heavy metals such as mercury in fluid streams can cause problems with downstream processing units as well as health and environmental issues if released as waste. Government regulations also limit amount of the mercury, for example, that may be discharged. Exemplary sources of the fluid streams containing one or more of the heavy metals include produced hydrocarbon gases, flue gas from combustion of fossil fuels, and gas mixtures generated with gasification facilities.

Treating gases upon recovery from hot underground formations and separation from liquid hydrocarbons provides an example of when desirable to have treatment to avoid treating of multiple gas streams and downstream contamination. Mercury removal from the streams presents problems with previous techniques. Many sorbents utilized for mercury removal require undesirable cooling of the streams for mercury retention by the sorbents.

Further, prior sorbents impregnated with metal provide limited stability. Such sorbents in particular fail to provide the metal in a single compositional phase that is stable. Even if the metal is present for example in a stabilized phase, such as a metal sulfide, these sorbents include some of the metal in an undesirable phase, such as elemental form or as metal oxide, which inhibits sorbent activity.

Therefore, a need exists for compositions suitable for treatment of fluids to remove heavy metals and methods of preparing and using the compositions.

BRIEF SUMMARY OF THE DISCLOSURE

In one embodiment, a method produces a silver sulfide impregnated support. The method includes forming silver oxide on a support and converting the silver oxide to silver sulfide. Reacting sulfur dioxide and one of hydrogen sulfide and hydrogen gas in presence of the support converts the silver oxide to the silver sulfide.

According to one embodiment, a method includes removing a heavy metal from a fluid stream by contacting the fluid stream with a sorbent. The sorbent includes a support impregnated with silver sulfide. Reacting sulfur dioxide and one of hydrogen sulfide and hydrogen gas in presence of the support converts silver oxide impregnated on the support to the silver sulfide.

For one embodiment, a composition includes a porous support material and silver sulfide. The support material is impregnated with the silver sulfide. Further, all silver bound to the support is present as $Ag_2S$ monophase.

BRIEF DESCRIPTION OF THE DRAWINGS

A more complete understanding of the present invention and benefits thereof may be acquired by referring to the following description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Synthesis of a support material impregnated with silver sulfide provides a sorbent composition. Generating the silver sulfide relies on reaction of sulfur dioxide and one of hydrogen gas and hydrogen sulfide in presence of the support material following silver loading of the support material. Contacting a fluid stream with the sorbent composition removes heavy metal from the fluid stream.

Gaseous mixtures in some embodiments define the fluid stream during the contacting with the sorbent compositions disclosed herein. Exemplary sources of the fluid stream containing the heavy metal include produced hydrocarbon gases, flue gas from combustion of fossil fuels, and gas mixtures generated with gasification facilities. The fluid stream may contain one or more of arsenic, beryllium, lead, cadmium, chromium, nickel, zinc, mercury and barium as the heavy metal that the sorbent composition sorbs during treatment of the fluid stream.

Figure 1:
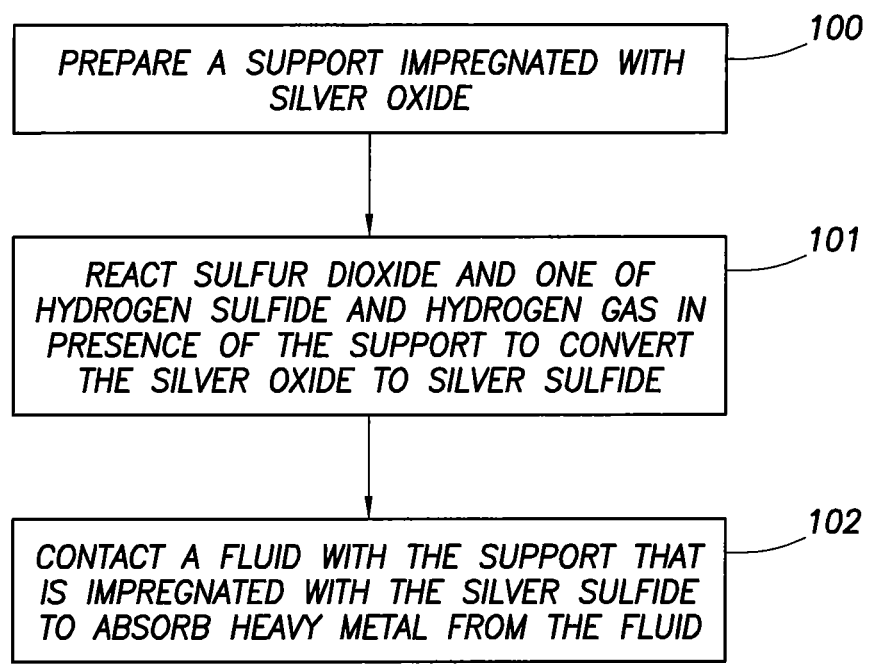
FIG. 1 is a flow chart illustrating a method of synthesizing and using a sorbent composition, according to one embodiment of the invention.

FIG. 1 shows a flow chart for a method of synthesizing and using the sorbent composition. A substrate preparation step 100 includes loading a support material with silver. Exemplary sources of the silver include soluble silver compounds dissolved in a solvent for mixing with the support material to thereby load the support material using incipient wetness. The silver compounds may include a mixture of different molecules or be all alike. In some embodiments, the silver in the solution may come from dissolution of a silver salt. The solution may contain the silver from silver nitrate ($AgNO_3$), silver halides such as silver chloride or organo-silver compounds. Other examples of silver precursor include silver acetate, silver formate and silver carbonate. Mass ratio of the silver compound to solvent in the solution may range from 1 part silver compound per 1000 parts solvent up to solubility limit of the silver compound. For use of the silver nitrate, water provides the solvent suitable for dissolving the silver nitrate.

Examples of the support material that is porous include zeolites, clays, activated carbon, alumina ($Al_2O_3$), silica ($SiO_2$) and combinations thereof. For some embodiments, the support material contains pores of about 4 angstrom in size and may be referred to as molecular sieve or molsieve.

Selected ratio of the support material to the solution mixed with support material provides silver content that is between 0.1 weight percent and 50.0 weight percent, between 10.0 weight percent and 20.0 weight percent, or about 15 weight percent of the sorbent composition.

In some embodiments, the preparation step 100 further includes separating the mixture to remove liquids from resulting solids defining the support material loaded with the silver and then drying and calcining the solids. The solids after the drying and calcining contain silver content in form of oxidized silver. The silver content following the drying and calcining may include elemental silver or other silver-containing compounds without inhibiting subsequent sulfiding, which may still yield silver sulfide products from all the silver content.

The drying for example removes residual water on the solids. Suitable drying time ranges from 0.1 hours to 10.0 hours with temperatures that may be between 30° C. and 500° C., between 50° C. and 150° C. or between 80° C. and 120° C. Heating the solids for between 0.1 hours to 10.0 hours to between 200° C. and 800° C. or between 350° C. and 550° C. under an inert or oxidizing atmosphere provide calcination of the solids upon being dried.

Other techniques may load the support material with the silver content for the subsequent sulfiding. For example, the substrate preparation step 100 may in some embodiments include treating an aqueous solution of silver nitrate with an alkali hydroxide to form the silver oxide, which is then deposited on the support material prior to the calcination. The substrate preparation step 100 thus provides the support material with at least some of the silver content not present as silver sulfide.

The method proceeds from the substrate preparation step 100 to a supported silver conversion step 101. A gaseous mixture including sulfur dioxide ($SO_2$) and hydrogen sulfide ($H_2S$) and/or hydrogen gas ($H_2$) passes over the solids at a temperature above 100° C., such as between 100° C. and 1000° C. For some embodiments, the gaseous mixture contains the hydrogen sulfide and sulfur dioxide in a $H_2S$ to $SO_2$ molar ratio of about 2:1, Further, the gaseous mixture may include an inert diluent such as nitrogen ($N_2$). The gaseous mixture contacts the solids as the sulfur dioxide and the hydrogen sulfide react to produce water and sulfur, which reacts with the silver oxide to form the silver sulfide and thereby provide the sorbent composition.

After the substrate preparation step 100 and the silver conversion step 101, the sorbent composition absorbs the heavy metal from the fluid stream passing into contact with the sorbent composition, in a treatment step 102. In particular, the fluid stream passes through a reactor packed with the sorbent composition. For some embodiments, the treatment step 102 defines a fixed bed process or a fluidized bed process. The fluid stream input into the reactor contains a higher concentration and more of the heavy metal than is present in the fluid stream output from the reactor. In some embodiments, the treatment step 102 removes at least 90%, at least 95% or at least 99% of the heavy metal, such as mercury, from the fluid stream.

For some embodiments, regeneration of the sorbent composition enables further use of the sorbent composition after becoming saturated with the heavy metal. Saturation may refer to detection of heavy metal breakthrough defined by having greater than 5% or greater than 10% of the heavy metal present in influent of the fluid stream into the reactor being present in effluent of the fluid stream from the reactor. The regeneration may include passing an inert gas stream through the reactor and in contact with the sorbent composition while heated to a higher temperature than during the contacting with the fluid stream. For example, the mercury desorbs in one embodiment from the sorbent composition when heated to above about 150° C. such that the sorbent composition may be heated to at least this temperature to release the mercury prior to reuse for removing the mercury from the fluid stream.

EXAMPLE 1

A solution was prepared by dissolving 4.22 grams of silver nitrate in 20.0 milliliters of de-ionized water. The solution was then added to 20.0 grams of molsieve. A resulting solid was dried at 100° C. for 1.0 hours before being calcined at 500° C. for 3.0 hours. After calcination, the solid was placed in a reactor and exposed to 200 milliliters per min (ml/min) of a first gaseous stream containing 1000 parts per million sulfur dioxide in nitrogen combined with a second gaseous stream containing 5 volume percent hydrogen sulfide in nitrogen and flowing at 5 ml/min. This mixture of the first and second gaseous streams was passed over the solid for 3 hours and at a temperature of 500° C. Flow through the reactor was switched to only nitrogen as resulting products therein were allowed to cool to ambient temperature.

Figure 2:
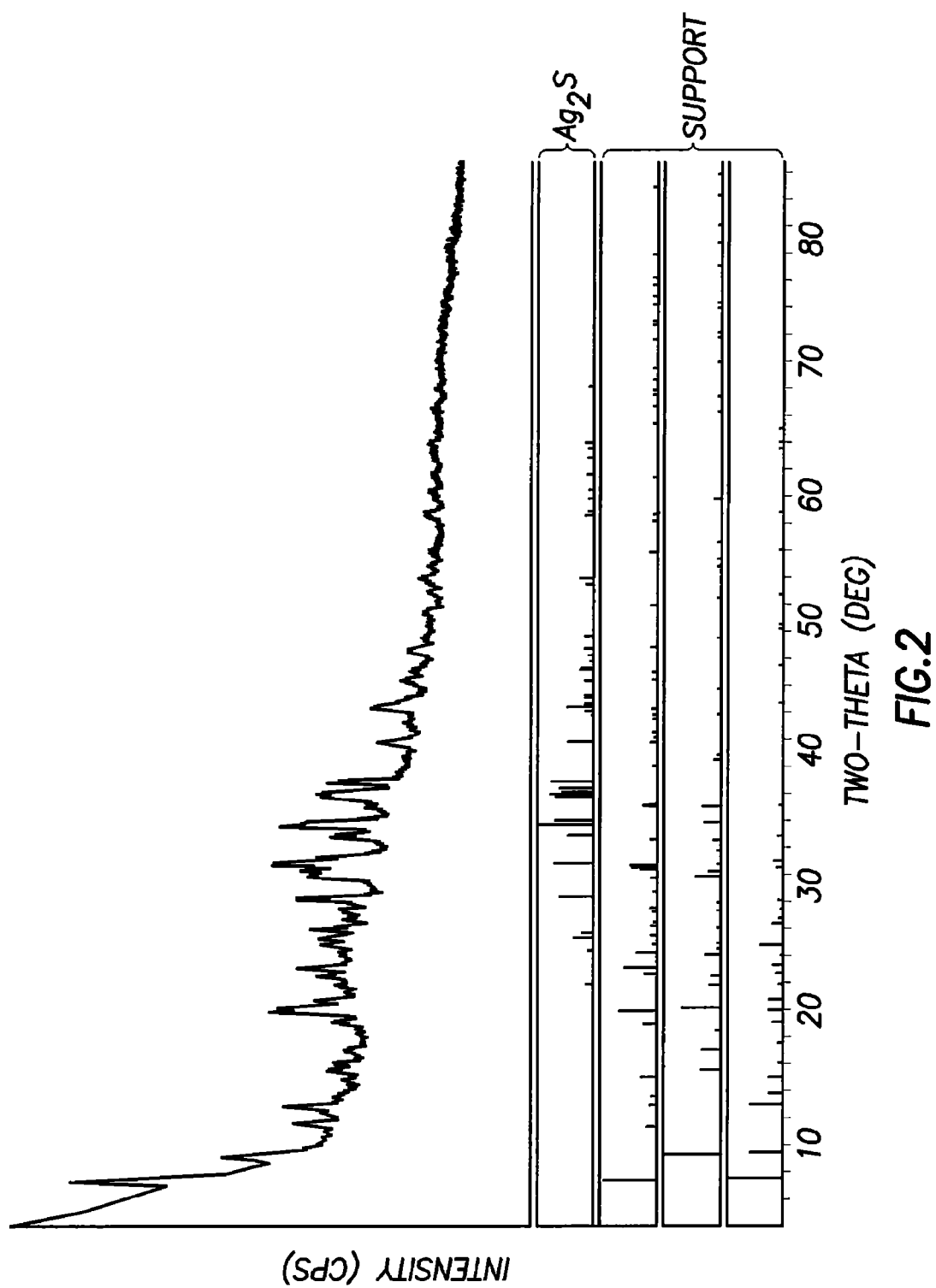
FIG. 2 is a graphic illustration of x-ray diffraction measurements of the sorbent composition, according to one embodiment of the invention.

FIG. 2 shows a graphic illustration of x-ray diffraction measurements of the products. Silver loading of the products was 11.51 weight percent. Further, all silver content of the product was present only as $Ag_2S$ monophase without any other silver-containing constituents, such elemental silver or silver oxide, remaining.

The product was packed into a bed. A test fluid stream of nitrogen containing about 725 nanograms per liter mercury was passed through the bed. Temperature of the bed was increased over time from about 20° C. to about 300° C. The mercury was removed from the test fluid stream with effluent from the bed containing less than 25 nanograms per liter while temperature of the bed remained between 20° C. and 100° C. At temperatures of 150° C. and above the mercury desorbed from the product.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:
1. A method consisting essentially of:
   forming from about 10.0 weight percent to about 20.0 weight percent silver oxide on a support;
   converting the silver oxide to silver sulfide by reacting sulfur dioxide and one of hydrogen sulfide and hydrogen gas in presence of the support; and contacting a mercury-containing fluid with the support that is impregnated with the silver sulfide for absorption of mercury from the fluid.

2. The method according to claim 1, wherein all silver on the support is present as $Ag_2S$ monophase after the converting.

3. The method according to claim 1, wherein silver content after the converting is about 15.0 weight percent of the support and is present only as $Ag_2S$ monophase.

4. The method according to claim 1, wherein forming the silver oxide includes mixing the support with a solution containing silver from one of silver nitrate, silver halides and organo silver compounds.

5. The method according to claim 1, wherein forming the silver oxide includes mixing the support with a solution formed by dissolution of a silver salt and then drying and calcining the support.

6. The method according to claim 1, wherein forming the silver oxide includes mixing the support with a solution formed by dissolution of silver nitrate in water and then drying and calcining the support.

7. The method according to claim 1, wherein the support is porous and includes one of zeolite, silica, alumina, activated carbon and clay.

8. The method according to claim 1, wherein the converting the silver oxide to silver sulfide includes reacting the sulfur dioxide and the hydrogen sulfide in presence of the support.

9. The method according to claim 1, wherein the converting the silver oxide to silver sulfide includes reacting the sulfur dioxide and the hydrogen gas in presence of the support.

* * * * *